(12) United States Patent
Borgmann et al.

(10) Patent No.: US 7,417,563 B2
(45) Date of Patent: Aug. 26, 2008

(54) PROCESS TO DETERMINE THE ABSOLUTE ANGULAR POSITION OF A MOTOR VEHICLE STEERING WHEEL

(75) Inventors: Uwe Borgmann, Recklinghausen (DE); Michael Köster, Dortmund (DE)

(73) Assignee: Leopold Kostal GmbH & Co. KG, Ludenscheid (DE)

( * ) Notice: Subject to any disclaimer, the term of this patent is extended or adjusted under 35 U.S.C. 154(b) by 199 days.

(21) Appl. No.: 11/481,866

(22) Filed: Jul. 6, 2006

(65) Prior Publication Data

US 2007/0030546 A1 Feb. 8, 2007

(30) Foreign Application Priority Data

Jul. 14, 2005 (DE) .............. 10 2005 032 871

(51) Int. Cl.
*H03M 1/22* (2006.01)
(52) U.S. Cl. ............................. 341/13; 341/1
(58) Field of Classification Search ............... 341/1–17
See application file for complete search history.

(56) References Cited

U.S. PATENT DOCUMENTS

| | | | |
|---|---|---|---|
| 4,572,952 A * | 2/1986 | March .................... | 250/237 G |
| 4,631,519 A | 12/1986 | Johnston | |
| 5,239,297 A * | 8/1993 | Kley ............................ | 341/13 |
| 6,038,029 A | 3/2000 | Finarov | |
| 6,459,389 B1 | 10/2002 | Germuth-Löffler | |
| 6,867,412 B2 * | 3/2005 | Patzwald et al. ....... | 250/231.13 |

FOREIGN PATENT DOCUMENTS

| | | |
|---|---|---|
| CH | 6 27 959 | 2/1982 |
| DE | 40 22 837 | 1/1992 |
| DE | 197 58 104 | 7/1999 |
| EP | 01 16 636 | 8/1984 |
| EP | 01 16 696 | 8/1984 |
| JP | 2005 030776 | 2/2005 |

* cited by examiner

*Primary Examiner*—Brian Young
(74) *Attorney, Agent, or Firm*—Brooks Kushman P.C.

(57) ABSTRACT

A method for determining the absolute value of a rotational angle includes imaging a continuous segment of a code track of a code carrier on a sensor array such that the sensor array generates a corresponding output signal. The code track includes a code provided over an angular range of 360°. The code contains a plurality of code words with each code word respectively corresponding to an angular value in the angular range. The output signal is correlated with a reference signal in a correlation filter to produce a correlation function signal. The reference signal is indicative of the code and the angular values corresponding to the code words. The correlation function signal is processed to determine the code word of the imaged segment of the code track as a function of the angular value where the output signal best coincides with the reference signal.

12 Claims, 1 Drawing Sheet

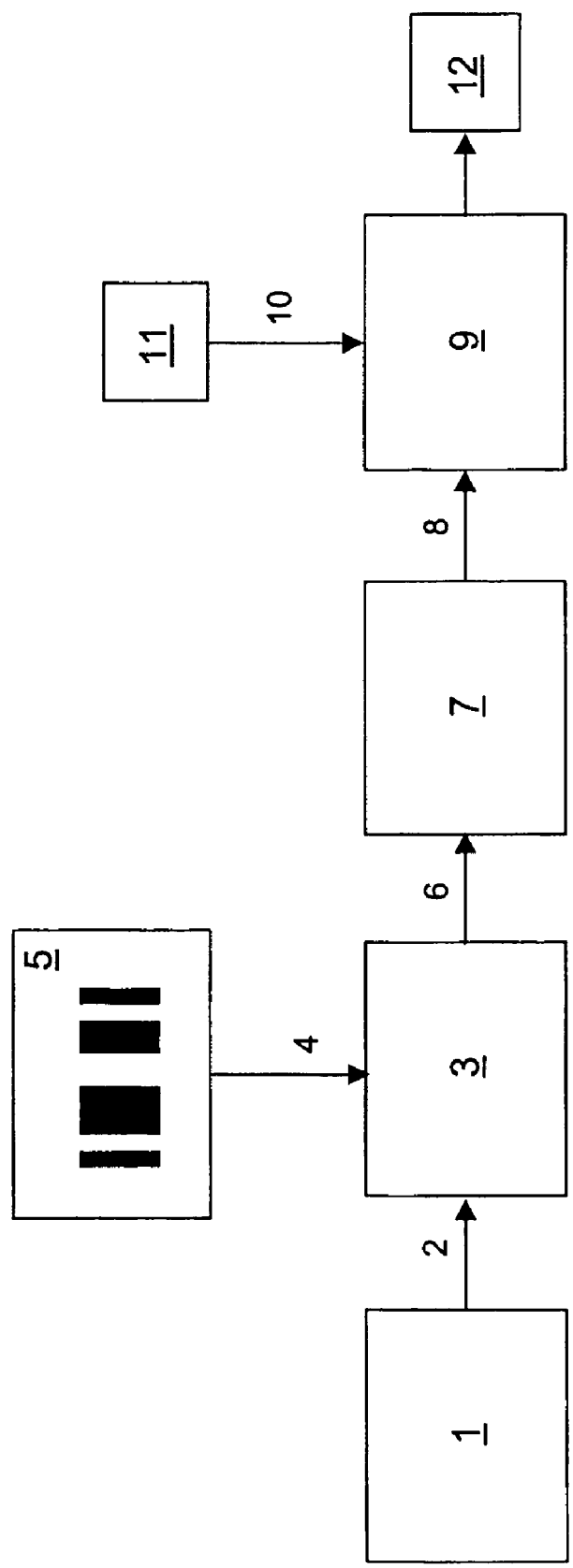

PROCESS TO DETERMINE THE ABSOLUTE ANGULAR POSITION OF A MOTOR VEHICLE STEERING WHEEL

CROSS-REFERENCE TO RELATED APPLICATIONS

This application claims priority to DE 10 2005 032 871.7, filed Jul. 14, 2005 in Germany, which is hereby incorporated by reference in its entirety.

BACKGROUND OF THE INVENTION

1. Field of the Invention

The invention relates to a process for determining the absolute value of a rotational angle, in particular the angular position of a motor vehicle steering wheel, by means of a transceiver comprising a light source and a sensor array having a plurality of optoelectronic transducers, and a code carrier arranged so that the code carrier can rotate with respect to the transceiver, the code carrier has a unique, single-track encoding of the angular values, a continuous segment of the encoding being imaged on the sensor array, and the output signal of the sensor array being evaluated to determine a code word corresponding to the current angular value.

2. Background Art

The absolute angular position of the steering wheel, also called the steering angle, is needed in motor vehicles so that this value can be supplied to a vehicle movement dynamics control system, for example. In addition to the mentioned steering angle value, such a vehicle movement dynamics control system receives other measurement data, such as the wheel speed or the rotation of the motor vehicle about its vertical axis. First the absolute steering angle and second the steering speed are needed so that these values, along with the other captured data, can be evaluated by the vehicle movement dynamics control system and converted to control actuators, for example the brakes and/or the engine management system.

DE 40 22 837 A1 discloses an optoelectronic steering angle sensor that is suitable to accomplish such a process. The steering angle sensor described in this document comprises an electronic control unit and a sensor unit consisting of two elements that are arranged so that they are parallel to one another and at a distance from one another—a light source and a line sensor—and, arranged between the light source and the line sensor, an encoder disk, which is connected with the steering shaft in a torsionally rigid manner. The line sensor provided is a CCD sensor. The encoding provided in this encoder disk is a light slit extending over 360° in the shape of a spiral of Archimedes. The illumination of corresponding transducers of the line sensor at a certain steering angle makes it possible to derive information about the real steering angle position. The spiral of Archimedes used as the encoding is continuous, so that it can be spoken of as an analog encoding. However, using the same arrangement it is just as possible to read a digital encoding on the encoder disk.

DE 197 58 104 A1 (corresponding to U.S. Pat. No. 6,459,389) discloses a process for determining the absolute value of a rotational angle. This process involves evaluating sharp signal changes, generally referred to as edges, in the sensor array's output signal to convert the signal into a contrast difference. A microcontroller decodes the contrast differences by comparing them with a black-and-white pattern representing the angle information.

Although in theory this process is able to achieve the goal of determining the sought-after angular value, it is very sensitive to any kind of interference. For example, dirt in the optical system can cast additional shadows, which also manifest themselves as edges in the electrical output signal, and thus cause additional contrast differences not corresponding to the encoding. Especially when used in an automobile, electromagnetic interference also occurs, which causes additional edges in the sensor array's output signal. However, since the evaluation process is based precisely on identifying and evaluating such edges, or rather the contrast differences derived from them, such spurious pulses cause corresponding measurement errors. Although such measurement errors can be recognized by means of appropriate procedures for plausibility checking of the measurement results derived from them, correction of these measurement results is impossible.

SUMMARY OF THE INVENTION

Starting from the background art which has been discussed, the invention therefore has the goal of further developing a process of the type mentioned at the beginning so as to achieve clearly increased insensitivity to outside influences, especially those caused by dirt or spurious electromagnetic pulses.

The process according to the invention achieves this goal by correlating, by means of a correlation filter, the sensor array's output signal with a reference signal representing all the angle information of the encoding, and determining the current code word as the position where the output signal best coincides with the reference signal.

The fact that the process according to the invention, in contrast to the background prior art, uses more or less the entire output signal simultaneously for evaluation, rather than only short pieces of the output signal, ensures that local interference, such as that which can be caused by dirt particles, for example, does not have such a strong effect on the result of the evaluation.

The position where the output signal and the reference signal coincide best is advantageously determined in the correlation filter by taking the output signal and the reference signal, and forming a correlation function from them, and determining the maximum of the correlation function in a maximum value filter.

A safety concept could involve evaluating the reliability of the determined angular value by comparing the determined maximum of the correlation function, in a decision filter, with an established correlation threshold, and only marking the corresponding code word for the angular value as valid if the maximum of the correlation function exceeds the correlation threshold.

BRIEF DESCRIPTION OF THE DRAWINGS

Further advantages and embodiments of the invention and the following description of an embodiment make reference to the attached single FIGURE showing a block diagram of the operational sequence of the process.

DETAILED DESCRIPTION OF THE PREFERRED EMBODIMENTS

This embodiment starts from an angular position sensor arrangement, in which a code carrier that has a code track representing a digital encoding of the angular values, is mounted so that the code carrier can rotate with respect to an optoelectronic transceiver. The code track represents a unique encoding of the angular values from 0 to 360°, and the transceiver's receiver is formed by a line sensor formed by a plurality of photodiodes, a so-called photodiode array (PDA). This example uses a PDA that has 128 individual photodiodes, also called pixels. This PDA is illuminated by the light transmitter associated with it, for example a light-emitting diode (LED), the transmitted light passing through the code carrier containing the encoding. The encoding is made, e. g., by a sequence of light-transmitting openings in the code carrier, which consists of an opaque material. If the illumination passes through this encoding in a radial direction, the encoding is realized as a track running around the outside of the cylindrical lateral surface of a corresponding code carrier, and if the illumination passes through it in the axial direction, it is realized as an annular track with a constant average radius on an encoder disk.

Illumination through this encoding will image, on the PDA, a light distribution representing the corresponding angular position. The output signal of the PDA caused by the light distribution forms the starting point of this process, in which this output signal is used to determine the underlying angle information.

To accomplish this, the output signal 2 of sensor array 1, which can contain diverse interference in addition to the desired information, is transferred to a correlation filter 3. Correlation filter 3 correlates the output signal 2 with a reference signal 4 stored in a reference signal memory 5. Reference signal 4 completely describes the code information contained on the code carrier and contains the relationship of the information to the angular value. The correlation is done mathematically by convoluting the output signal 2 with the reference signal 4. The result of this convolution operation is a correlation function 6, which forms the output signal of the correlation filter 3. The correlation function 6 describes the degree to which the output signal 2 coincides with the reference signal 4 as a function of the code position or the angular value. Therefore, the maximum value of this correlation function 6 indicates the position where the output signal 2 and the reference signal 4 best coincide. Filter stage 7 determines this maximum value of the correlation function 6, forms a pair of values comprising the maximum value and the corresponding code position, and transmits this pair of values to decision stage 9. Decision stage 9 compares the maximum value of the correlation function 6 with a correlation threshold 10, which is stored in a correlation threshold memory 11. If the maximum value of the correlation function 6 is greater than the correlation threshold 10, then the corresponding angular value is marked as valid for further processing, and passed on to succeeding control units 12.

The height of the correlation threshold 10 that is established depends on the selected safety concept of the entire system. The higher the threshold, the more certain the angular value that is determined with it. However, a threshold that is too high can reduce the availability of the angle sensor system, since the higher the threshold is, the greater the probability that the correlation function does not exceed it, and in this case no valid angular value is output.

Thus, the correlation threshold provides a way of reaching a compromise between the opposing requirements of certainty and availability that is best for each application. For example, given a correlation threshold of 0.5, a 50% coincidence of the sensor signal 2 and the reference signal 4 would be sufficient for certain determination of the steering angle. This makes it possible for distortion of the sensor information, for example due to dirt in the optical system or electrical interference in the transmission of information, to be tolerated up to a certain limit.

The resolution of the angle determination is dependent not on the resolution of the light/dark information of the code track, but rather corresponds to the resolution with which the correlation function is determined. This is limited only by the computing power which is available to the correlation filter.

What is claimed is:

1. A method for determining the absolute value of a rotational angle, the method comprising:
    imaging a continuous segment of a code track of a code carrier on a sensor array such that the sensor array generates a corresponding output signal, wherein the code track includes a code provided over an angular range of 360°, wherein the code contains a plurality of code words with each code word respectively corresponding to an angular value in the angular range;
    correlating the output signal with a reference signal in a correlation filter to produce a correlation function signal, wherein the reference signal is indicative of the code and the angular values corresponding to the code words; and
    processing the correlation function signal to determine the code word of the imaged segment of the code track as a function of the angular value where the output signal best coincides with the reference signal, wherein processing the correlation function signal includes determining the maximum value of the correlation function signal in a maximum value filter and determining the angular value where the output signal best coincides with the reference signal as the angular value corresponding to the maximum value of the correlation function signal.

2. The method of claim 1 wherein:
    correlating the output signal with the reference signal in the correlation filter to produce the correlation function signal includes convoluting the output signal with the reference signal.

3. The method of claim 1 further comprising:
    comparing the maximum value of the correlation function signal with a correlation threshold value in a decision filter; and
    marking the determined code word of the imaged segment of the code track as valid if the maximum value of the correlation function signal exceeds the correlation threshold value.

4. The method of claim 3 further comprising:
    setting the correlation threshold value at a given value to provide a corresponding certainty of the validness of the determined code word.

5. A method comprising:
    imaging a continuous segment of a code track on a sensor such that the sensor generates a corresponding output signal, wherein the code track includes a code provided over an angular range of 360°, wherein the code contains a plurality of code words with each code word respectively corresponding to an angular value in the angular range;
    correlating the output signal with a reference signal to produce a correlation function signal, wherein the reference signal is indicative of the code and the angular values corresponding to the code words; and
    processing the correlation function signal to determine the code word of the imaged segment of the code track as a function of the angular value where the output signal best coincides with the reference signal, wherein processing the correlation function signal includes determining the maximum value of the correlation function signal and determining the angular value where the output signal best coincides with the reference signal as the angular value corresponding to the maximum value of the correlation function signal.

6. The method of claim 5 wherein:
correlating the output signal with the reference signal to produce the correlation function signal includes convoluting the output signal with the reference signal.

7. The method of claim 5 further comprising:
comparing the maximum value of the correlation function signal with a correlation threshold value; and
marking the determined code word of the imaged segment of the code track as valid if the maximum value of the correlation function signal exceeds the correlation threshold value.

8. The method of claim 7 further comprising:
setting the correlation threshold value at a given value to provide a corresponding certainty of the validness of the determined code word.

9. A method comprising:
imaging a continuous segment of a code track on a sensor such that the sensor generates a corresponding output signal, wherein the code track includes a code provided over an angular range of 360°, wherein the code contains a plurality of code words with each code word respectively corresponding to an angular value in the angular range;
correlating the output signal with a reference signal to produce a correlation function signal, wherein the reference signal is indicative of the code and the angular values corresponding to the code words;
determining the maximum value of the correlation function signal; and
determining the code word of the imaged segment of the code track as a function of the angular value where the output signal best coincides with the reference signal, wherein the angular value where the output signal best coincides with the reference signal is the angular value corresponding to the maximum value of the correlation function signal.

10. The method of claim 9 wherein:
correlating the output signal with the reference signal to produce the correlation function signal includes convoluting the output signal with the reference signal.

11. The method of claim 9 further comprising:
comparing the maximum value of the correlation function signal with a correlation threshold value; and
marking the determined code word of the imaged segment of the code track as valid if the maximum value of the correlation function signal exceeds the correlation threshold value.

12. The method of claim 11 further comprising:
setting the correlation threshold value at a given value to provide a corresponding certainty of the validness of the determined code word.

\* \* \* \* \*